June 17, 1952  S. C. WATSON  2,600,592
VARIABLE-SPEED TRANSMISSION
Filed Oct. 22, 1947  4 Sheets-Sheet 1

Inventor
Sydney C. Watson
by Parker & Carter
Attorneys.

Inventor
Sydney C. Watson
by Parker & Carter
Attorneys

June 17, 1952     S. C. WATSON     2,600,592
VARIABLE-SPEED TRANSMISSION
Filed Oct. 22, 1947     4 Sheets-Sheet 3

CLUTCH MAGNET COIL

Inventor
Sydney C. Watson
by Parker & Carter
Attorneys

June 17, 1952     S. C. WATSON     2,600,592
VARIABLE-SPEED TRANSMISSION
Filed Oct. 22, 1947     4 Sheets-Sheet 4
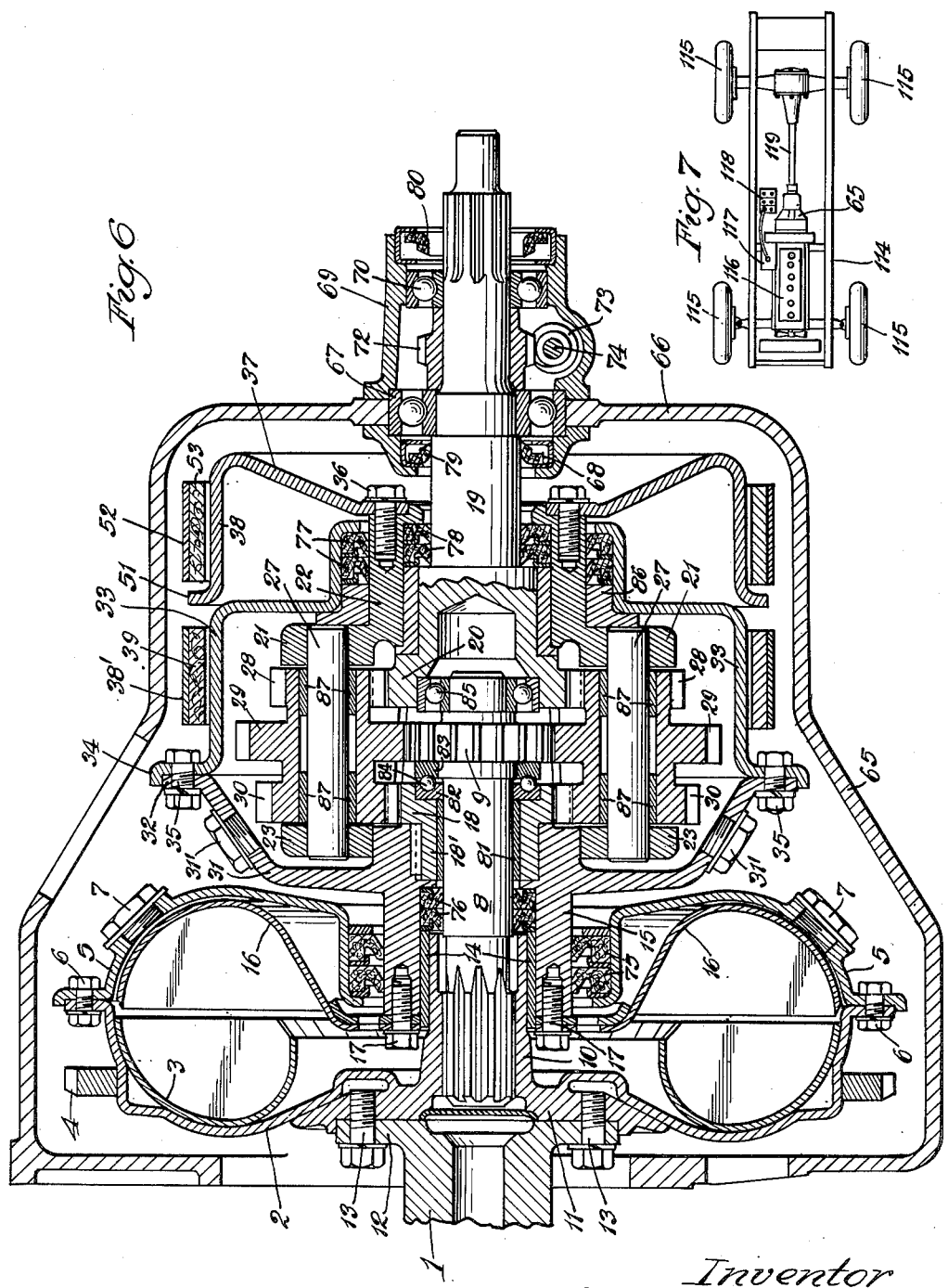
Inventor
Sydney C. Watson
by Parker & Carter
Attorneys Patented June 17, 1952

2,600,592

UNITED STATES PATENT OFFICE 2,600,592

VARIABLE-SPEED TRANSMISSION

Sydney C. Watson, Chicago, Ill., assignor to Tor-Vel Associates

Application October 22, 1947, Serial No. 781,345

6 Claims. (Cl. 74—688)

This invention relates to a variable speed transmission—that is to say, to a transmission in which a driving member, such as a shaft, drives a driven member, such as another shaft, and in which means are provided whereby the driven shaft is operated at a variable speed from the driving shaft. It has for one object to provide an automatically variable means interposed between the driving and the driven member, which means varies automatically in response to variations in torque requirements of the driven member.

Another object of the invention is to provide, in connection with such means in a variable speed transmission, manually or positively controlled means for effecting a fixed geared reduction between the driving and the driven member.

Another object of the invention is to include in a device of the type indicated clutch means which can be disengaged when the positive geared reduction drive is in operation.

A still further object is to provide manually or positively controlled means for effecting a reversal of direction between the driving and the driven member.

Another object of this invention is, therefore, to provide a means for connecting a driving member or source of power to a driven member or load through a variable mechanically geared ratio to meet changing torque requirements and which, in addition, will permit stoppage of the driven member without stopping the driving member and without the use of a clutch or other disengaging device. It also provides means for reversing the direction of rotation of the driven member.

A further object is to provide means for rigidly connecting the driving and driven members at a positive geared reduction ratio under certain conditions.

Another object is to provide in an automatic drive of the type indicated a hydraulic coupling including an impeller and a runner, and to provide clutch means between the runner and the gear which is operated by it, whereby that gear may be disengaged during the period of positive low or reverse gear drive.

A still further object is to provide an electrically operated friction clutch in the transmission indicated.

Other objects will appear from time to time throughout the specification and claims.

The invention is illustrated in one form more or less diagrammatically. As shown in that form, it is embodied in a transmission which, among other uses, may be used to drive an automotive vehicle. It is, of course, not limited to that use.

Figure 6 is a view generally similar to Figure 1 showing a modified form without clutch; and Figure 7 is a plan view of an automobile.

Figure 1:
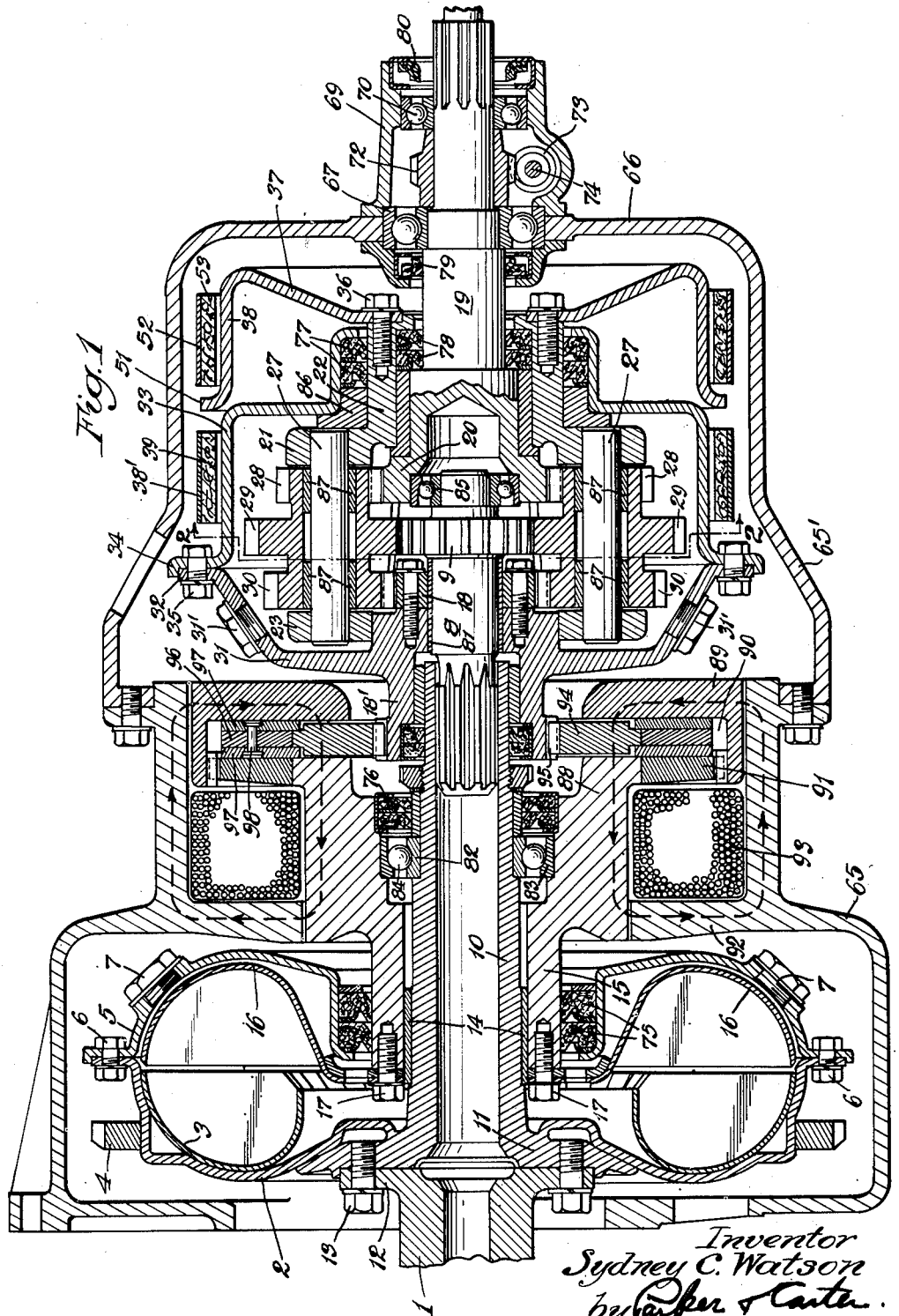
Figure 1 is a longitudinal section through one form of the device.

Like parts are indicated by like characters throughout the specification and claims.

As shown, the device includes a driving shaft, a driven shaft, certain gearing and a fluid coupling of the Foettinger type, having an impeller secured to the driving shaft and a runner to be driven by the impeller. An electromagnetic clutch is also included.

1 is a driving shaft which may be driven by any suitable source of power which, as shown, may be driven by the engine of an automotive vehicle. Secured to the shaft 1 is a portion 2 of a fluid coupling housing. Within the portion 2 is secured an impeller 3. A gear 4 may be secured to the housing portion 2 for use in starting the engine which drives the shaft 1. A second fluid coupling housing member 5 is secured to the housing portion 2 by bolts 6, or otherwise, and may include one or more filling and draining openings which are closed by screw plugs 7, if desired.

Also secured to and driven by the driving shaft 1 or other source of power is a shaft 8 to which is affixed a small sun gear 9. The gear might, of course, be made integral with the shaft. For convenience in assembly and mounting, the shaft 8 is attached to and positioned partially within a sleeve 10, which is itself integral with an enlargement 11. This enlargement is secured to a corresponding enlargement 12, integral with the driving shaft 1. Screws 13 or other means are used for fastening the members 11 and 12 together. A portion of the outer surface of the sleeve 10 is cylindrical in shape, and the bearing sleeve or ring 14 is positioned upon it. Both the shaft 8 and the sleeve 10 are telescoped within a sleeve 15 which is secured to the runner 16 of the fluid coupling by screws 17, or otherwise.

A larger sun gear 18 is attached in any suitable manner to a sleeve-like portion 18' which is positioned about a part of the sleeve 10 and the shaft 8.

Coaxial with the driving shaft 1 is a driven shaft 19. Affixed to or formed integrally with the driven shaft 19 is a sun gear 20, which is larger than either of the sun gears 9 and 18. The sun gears 9, 18 and 20 have been spoken of as being one larger than the other. 9 is the smallest; 18 is the second in size; and 20 is the largest. All these gears are preferably of the same pitch.

To carry out the invention and to accomplish the desired results, the sun gear which is driven by the runner 16 of the fluid coupling must be larger than and must contain more teeth than the sun gear 9, which is attached to the shaft 8 and thus at times rotates in fixed relation with the impeller 3, the shaft 8 and the driving shaft 1. Also, the sun gear 20 which is attached to and rotates with the driven shaft must be larger than and must contain more teeth than the sun gear 18, which rotates with and is driven by the runner 16.

Figure 2:
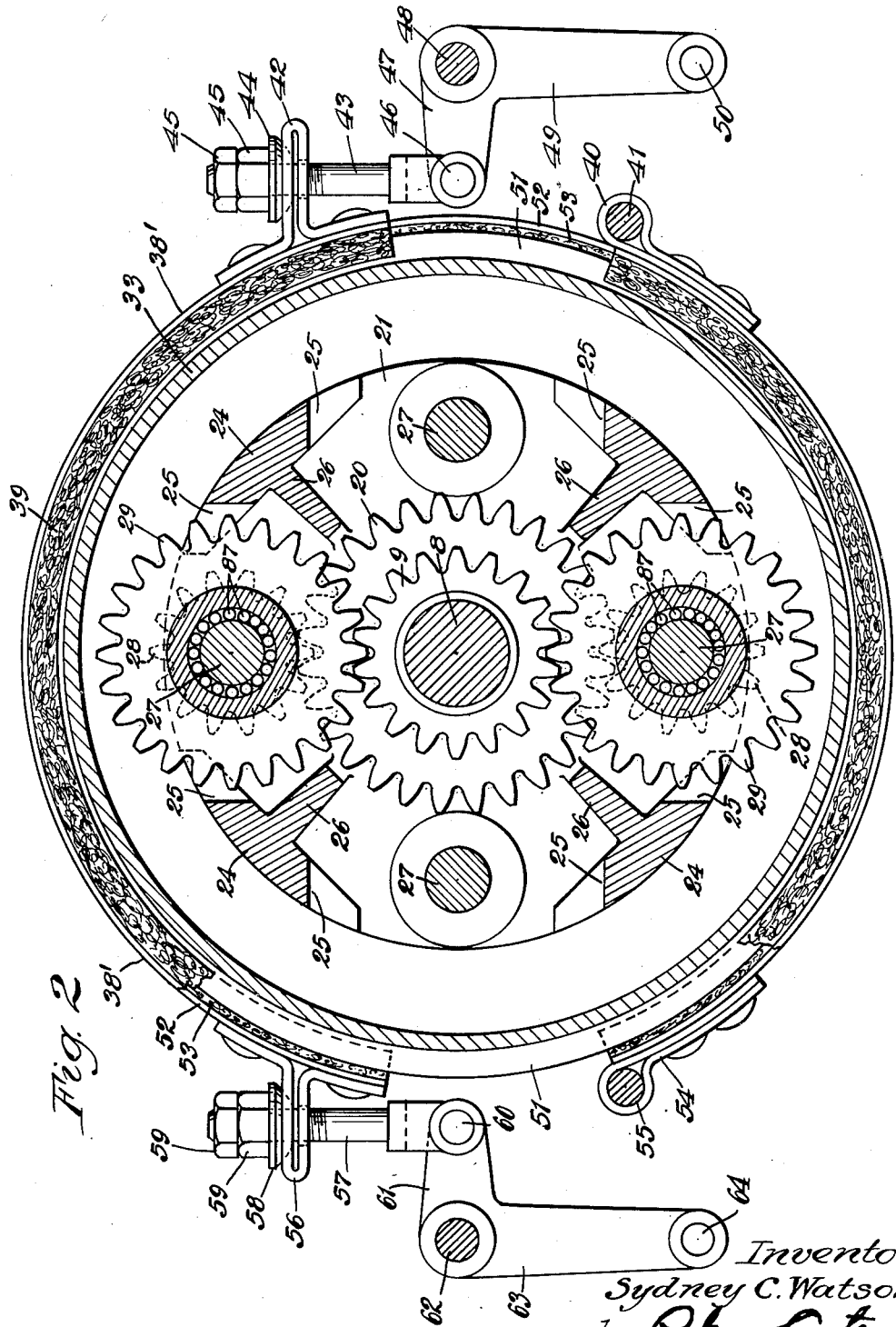
Figure 2 is a transverse section taken on an enlarged scale at line 2—2 of Figure 1, looking away from the fluid coupling.

Coaxial with and surrounding the three sun gears is a floating carrier which includes the ring-like portion 21 to which a sleeve 22 is attached and which includes also the ring-like portion 23. The portions 21 and 23 are secured together by members 24, which as shown particularly in Figure 2, are partially cut away, as at 25, to provide room for gears which will be described below and which may also include a web-like portion 26, which is provided for additional strength.

Mounted in the floating carrier is a plurality of shafts 27. Each shaft is mounted at one end in the member 21 and at its other end in the member 23. Mounted for rotation upon each of the shafts 27 is a plurality of planetary cluster gears, each of which is composed of three gears, preferably made integral, although they may be secured together. Thus each of the cluster gears includes a small gear 28 which meshes with the largest sun gear 20, a larger gear 29 which meshes with the smallest sun gear 9 and an intermediately sized gear 30 which meshes with the intermediately sized sun gear 18.

Attached to and preferably integral with the sleeve 18' is a housing member 31, which is provided with filler openings closed by plugs 31' and which terminates in a flange 32 to which is secured a housing or shell 33, which itself terminates in a flange 34. The flanges 32 and 34 are secured together by bolts 35, or otherwise. The housing or shell 33 serves as a casing to enclose the various parts of the gearing and also serves as a brake drum to be acted upon by a brake band or brake shoe, as will be described below.

The sleeve 22 is secured to or integral with the carrier. In the particular form here shown, it is clearly indicated as being integral with the ring-like portion 21 of the carrier. This sleeve extends through the shell or housing portion 33. Fastened to the sleeve 22 by screws 36, or otherwise, is a second brake drum member 37, having a drum-like portion 38 capable of being acted upon by a brake band or shoe.

The portion of the shell 33 which is capable of being acted upon by a brake band or shoe is shown in longitudinal section in Figure 1 and in transverse section in Figure 2. While many different sorts of brake bands and brake shoes and other brake members may be used, one suitable form is shown herewith. As shown, it comprises a brake band 38' within which a brake lining 39 is mounted. The brake lining may be of any suitable material. At one end the brake band is provided with an eye 40 which is secured upon a member 41. This member is normally stationary. Adjacent its opposite end the brake band 38' is provided with an outwardly projecting eye member 42, within which is received a rod 43. A rounded wearing member 44 may be positioned about the rod 43, and adjusting and locking nuts 45 may be used to hold the parts in adjusted position. The rod 43 is pivoted, as at 46, upon one arm 47 of a bell crank. The bell crank is supported for rotation upon the member 48. The bell crank is provided with a second arm 49 perforated, as at 50, to receive an operating member by means of which the brake band may be tightened or loosened.

The brake drum portion 38 may be, if desired, provided with a flange 51, and about the drum 38 is mounted a brake band 52 within which is secured braking material 53. At one end the band 52 is provided with an eye member 54 which is secured to a member 55 which is stationary. Adjacent its opposite end the brake band 52 is provided with an outwardly projecting eye portion 56 through which a threaded shaft 57 penetrates. A rounded wearing member 58 may be positioned about the shaft 57 in contact with the eye member 56. Locking and adjusting nuts 59 are provided on the threaded end of the member 57, and by means of these nuts the parts may be held in adjusted position. At its opposite end the shaft 57 is mounted for rotation, as at 60, in one arm 61 of a bell crank. The bell crank itself is mounted for rotation on a member 62. A second arm 63 of the bell crank is perforated, as at 64, to receive an operating means whereby the crank may be moved to tighten and to loosen the brake band.

If desired, a housing may be provided to enclose the fluid coupling, the gearing, the brake drums and the brakes. Such a housing 65, 65' is shown in Figure 1, and it is shaped generally to surround and enclose the parts within it. It might, of course, have any other shape. At one end it is provided with a portion 66 which substantially closes the end. An anti-friction bearing 67 is positioned in the opening which remains in the wall 66, and the driven shaft is supported in this bearing.

If desired, a sleeve-like member 69 may be secured to the member 66, and a second anti-friction bearing 70 is mounted within the sleeve and assists in supporting the driven shaft. If desired, a gear 72 may be mounted upon the driven shaft and may mesh with a gear 73 carried upon a shaft 74. The gear assembly including the gears 72 and 73 is useful for operating a speedometer where the device of this invention is mounted in an automotive vehicle. It is to be understood that the speedometer drive and the particular bearing construction shown generally about the end of the driven shaft form no essential part of the present invention, because the parts might be otherwise enclosed and otherwise supported, and the speedometer drive might be entirely omitted.

Sealing members may be provided in a number of places throughout the mechanism, and while their details form no particular part of the present invention, because many different sorts of sealing members might be embodied in the device, we shall refer to the sealing members shown.

As shown in Figure 1, a plurality of sealing members 75, 75 is provided between the inner portion of the housing 5 and the outer surface of the sleeve-like member 15. These are to prevent the escape of fluid within the coupling. One or more sealing and packing members 76 are provided within the sleeve-like member 15 in contact with its inner surface and in contact with the sleeve 10. They retain lubricant in the bearing and prevent movement of the coupling fluid along the shaft 8 into the interior of the gear assembly.

Toward the right end of the device as shown in Figure 1 one or more sealing and packing members 77 may be provided within the housing or shell 33 and in contact with the sleeve-like portion 22, and they, of course, prevent escape of lubricant from within the shell. Likewise, one or more sealing and packing members 78 may be provided within the sleeve 22 and in contact with the driven shaft 19.

Means are generally provided to seal the outer portion of the driven shaft, and thus a packing 79 may be used adjacent the anti-friction bearing 67, and a packing 80 may be used within the sleeve-like member 69 and about the outer end of the driven shaft. This packing is spaced away from the splined end of that shaft, because when the device is used, a member embraces the splined end and in that case the packing 80 is in contact with that member.

Throughout the device bearing members and anti-friction members are used as desired, and the invention is not limited to any particular bearing details. Those shown, however, will be described.

Thus a bearing sleeve 81 may be positioned about the shaft 8 and within the sleeve-like portion 18'. A combined ball and thrust bearing may be positioned between the sleeves 10 and 15. As shown it comprises a race 82, a race 83 and balls 84.

A combined thrust and anti-friction bearing 85 may be positioned about the reduced end of the driving shaft 8. As shown, the races of the bearing 85 are shaped to provide shoulders which resist thrust. Another type of combined anti-friction and thrust bearing might also be used.

A bearing ring 86 may be positioned between the shell 33 and the sleeve 22. As shown, this ring contacts the portions 21 and 22 of the carrier and also contacts the shoulder formed on the inner surface of the shell 33. The cluster gears may be provided with anti-friction members 87. As shown, these members are rollers, needles or other rotary members.

The sleeve-like portion 15 is enlarged, as at 88, and supports an outwardly extending portion 89, which is separated from it by a slot 90. A ring 91 is fixed to the member 88 and splined, or otherwise engaged, with the member 89. The ring 91 is formed of brass or other non-magnetic material. The housing portion 65 is provided with an inwardly extending portion 92 within which is fixedly mounted a magnetic coil 93.

A disc 94 is splined to the sleeve 18', as at 95, and includes a portion 96 of brass or other non-magnetic material. On each side of the member 96 is secured a brake surface member 97. These members are held in place by rivets 98.

Figure 4:
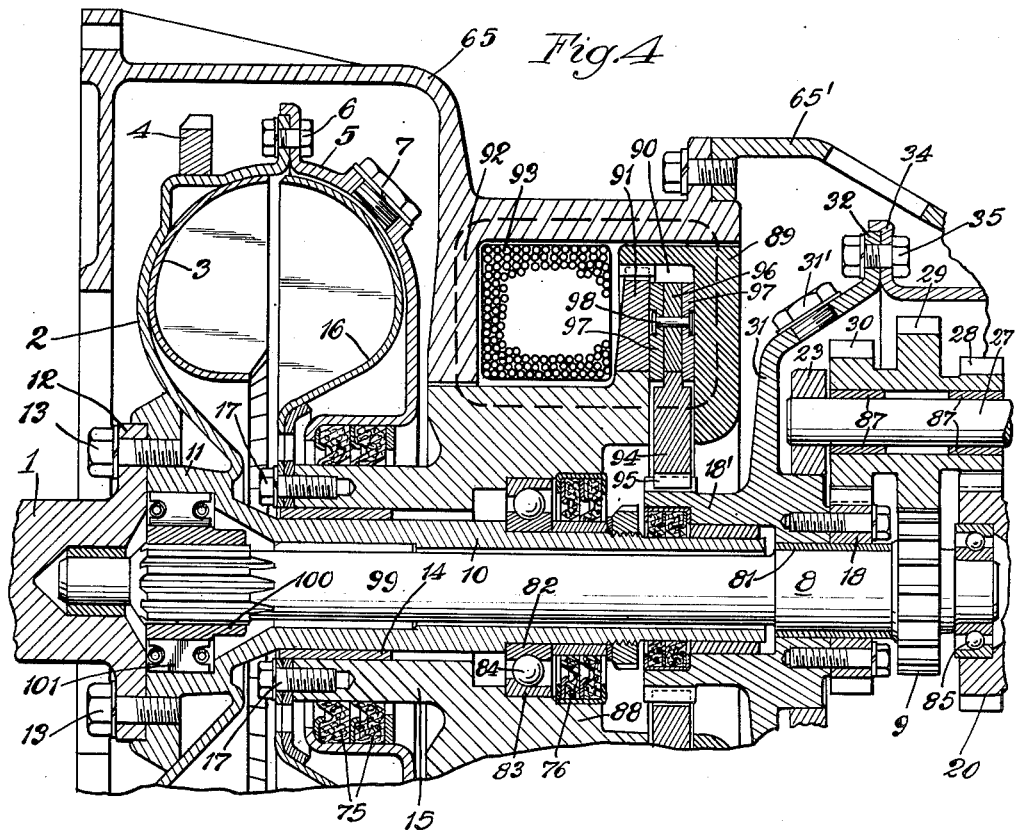
Figure 4 is a view generally similar to Figure 1, illustrating a modified construction.

In the modified form of Figure 4 the parts are generally as above described, except that an overrunning or one-way clutch mechanism is provided between the shaft 1 and the shaft 8. The shaft 8, instead of being splined to the sleeve 10 as shown in Figure 1, for example, is provided with an extension 99 which is splined into a collar 100. Between the collar 100 and the sleeve-like portion 11 is mounted a one-way or overrunning clutch 101.

Figure 5:
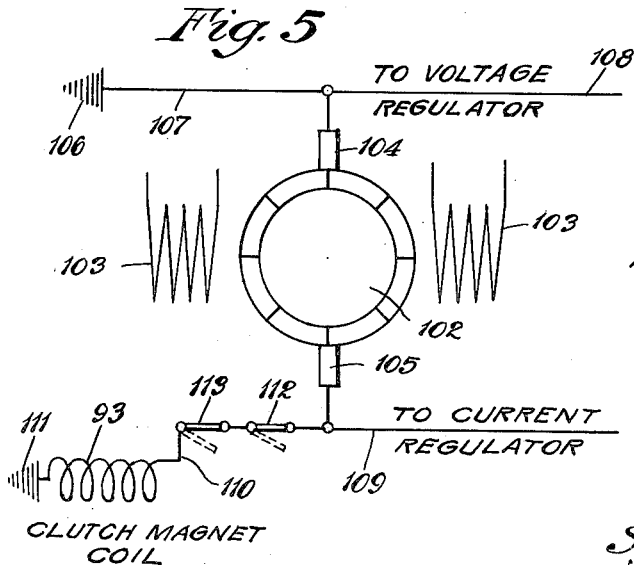
Figure 5 is a schematic diagram illustrating a suitable electrical circuit for control and operation of the clutch.

Figure 5 illustrates a schematic wiring diagram for the operation of the electromagnetic clutch. As shown, 102 is the armature of an electric generator mounted on a vehicle on which the drive of the present invention is also mounted. The generator is driven when the prime mover of the vehicle is driven. The generator is provided with coils 103 and brushes 104, 105. The brush 104 is grounded, as at 106, by means of a conductor 107. It is connected to a voltage regulator not shown by a conductor 108. The brush 105 is connected to a current regulator not shown by a conductor 109. A conductor 110 connects the brush 105 to the magnetic coil 93 which is grounded, as at 111. Positioned in the conductor 110 are two switches 112 and 113. Each is arranged to remain closed normally and each is connected to one of the brake bands or brake band operating mechanisms. Thus the switch 112 is connected to the brake band 38' or to its operating mechanism and the switch 113 is connected to the brake band 52 or to its operating mechanism.

In this manner when both of the brake bands are inactive the switches remain closed. When either of the brake bands is actuated to engage its respective brake drum, its switch is opened and the magnet de-energized because as the switch opens the circuit to the magnet is broken. When both switches are closed and the prime mover is in operation the generator is operated and the magnetic coil is energized.

In the form of Figure 6 many of the parts are identical in shape, association and function with correspondingly numbered parts in the form of Figure 1. The only differences between the structures of the two figures are those necessary because of the omission of the electromagnetic clutch from the structure of Figure 6.

In Figure 6 the sleeve-like portion 18' is integral with the gear 18 and is splined to the sleeve 15. The gear 18, however, performs the same function in the planetary gear assembly in both forms of the device, and hence it and the sleeve 18' are designated by the same numerals in both figures.

In the form of Figure 6, since no space need be provided for the magnet and clutch, the housing 65 is adequate to enclose the entire assembly. The sealing members throughout are substantially the same. The sealing member 76 as shown in Figure 1 is positioned between the sleeves 15 and 10. In the form of Figure 6 the sleeve 10 is shorter than in the form of Figure 1, although it performs the same function since the shaft 8 is splined to it in both cases. Because the sleeve 10 is shorter in Figure 6, the packing assembly 76 is positioned between the sleeve 15 and the shaft 8.

In view of the fact that the parts are generally identical in the forms of Figure 1 and Figure 6, the structure of Figure 6 need not be redescribed herewith.

Figure 7 illustrates diagrammatically an automobile having a frame 114, wheels 115, an engine 116, a generator 117, and a battery 118. A transmission illustrated in the other figures and contained in the housing 65 is connected to the engine and by means of a shaft 119 drives the rear wheels through any suitable gearing not shown.

Although I have shown an operative form of my invention, it will be recognized that many changes in the form, shape and arrangement of parts can be made without departing from the spirit of the invention, and my showing is therefore to be taken as, in a sense, diagrammatic.

The invention is not limited to the use of the generator circuit to operate the clutch. Under some conditions, another circuit and another source of current may be used. The battery circuit may be used.

The use and operation of this invention are as follows:

The operation of the form of Figure 6 will be described first. When the load which is to be driven and which may be a vehicle, a machine or other device requiring to be driven is stationary, the engine or other driving means may be allowed to idle or to rotate at a low rate of speed. At this low rotative speed the torque imparted to the runner of the fluid coupling by the impeller of the coupling and hence to the intermediate sun gear 18 is not sufficient to overcome the inertia of the dead load.

When the driving member is thus rotating and because of the slight torque imparted to the runner, the driven shaft and the gear 20 attached to it are stationary. The drive is then from the engine or driving shaft 1 of the smallest sun gear 9 to the larger gear 29 in the planetary cluster gears. When the planetary cluster gears rotate about their individual axes and the gear 20 attached to the driven shaft 19 is stationary, a backward orbital rotation of the planetary gear carrier results, because the gear 20 becomes, in effect, a stationary rack about which the planetary gears wind themselves. This orbital rotation of the planet gears, combined with their rotation about their axes, imparts a forward rotation to the sun gear 18 which, of course, permits the runner of the fluid coupling to rotate in the same direction as the impeller, but at a reduced speed and without imparting any rotation to the gear 20.

There is, therefore, a definite ratio of rotative speed between the impeller 3 and the runner 16 of the fluid coupling when the driving member 1 is rotating and the driven member 19 with its gear 20 is stationary.

As the rotative speed of the driving member, such as the engine, is increased, the speed of the impeller 3 of the fluid coupling is correspondingly increased. This results in imparting an increased torque to the runner and to the sun gear 18 which is secured to it. When this increased torque is sufficient to decrease the reduction ratio between the impeller 3 and the runner 16, it imparts a forward rotation to the gear 20, which is attached to the driven shaft 19. When the torque required by the driven shaft does not exceed the torque available at the driving shaft, the runner 16 tends to attain the same speed as the impeller 3 up to the point of minimum coupling slip, and thus after the torque requirement is reduced, the driven shaft 19 tends automatically more and more to rotate at the same speed as the driving shaft 1.

Sometimes an excessive torque is required to rotate the driven shaft 19. This occurs in the case of starting an automotive vehicle or in the case of a heavy overload, should the device be used for some other drive. Under these conditions, the brake band 52 is tightened and it stops the drum 38 and through it stops rotation of the planetary carrier. The result of this stoppage is a positive geared reduction drive from the smallest sun gear 9 through the planet cluster gears to the gear 20, which is attached to the driven shaft 19. If the smaller sun gear 9 is driven directly by the engine or other source of power, the fluid coupling is at this time by-passed, and the drive from the driving shaft 1 to the driven shaft 19 is at a predetermined positive reduction.

To obtain a reverse rotation of the driven shaft 19, the brake 38' is applied and this stops rotation of the housing 33, 31, and correspondingly stops the rotation of the gear 18. This results in a backward rotation of the planet carrier and as the gear 20 which is attached to the driven shaft 19 is larger than the gear 18 which is stationary at this time, it also produces a backward rotation of the gear 20 and the driven shaft 19.

Under normal operating conditions, when frequent and moderate changes in torque requirements occur and when such changes result in reduced speed of the runner 16, the total reduction ratio between the driving shaft 1 and the driven shaft 19 is proportionately increased, and this results in an automatically variable speed transmission within the design limits which control the total design of the entire assembly.

The operation of the form of Figure 1 is in many respects the same as the operation of the form of Figure 6 as described below. The electromagnetic clutch, however, modifies the operation of the device when it is used. When the magnet is not energized the clutch is disengaged and the operation of the device of Figure 1 is the same as that described above in connection with Figure 6.

The form of Figures 1–5, inclusive, while generally similar to the form of Figure 6, embodies the electromagnetic clutch and has certain advantages over the other form. In the case of the form of Figure 6, when the positive gear below is in use, both the runner and impeller of the fluid coupling are driven by the engine at a proportionate rotative speed for each. In one example, when the engine and impeller are operating at a thousand R. P. M., the runner rotates at 510 R. P. M. Experiment and experience under these conditions have shown that the engine will turn up to a speed at which the maximum engine torque is obtained, but will not turn up to a higher speed regardless of the possible maximum engine speed. Thus, in the case of a Chevrolet truck engine, maximum torque is produced at 1250 R. P. M. engine speed, while the engine has a potential maximum speed of approximately three times that figure. Obviously, this is a disadvantage when it is considered that in a vehicle using a conventional clutch and sliding gear transmission, the engine can be run up to its maximum speed while the low gear is engaged, thus permitting a possible forward speed for a given engine much higher than that which is possible for the same engine when used with the form shown in Figure 6.

The same disadvantage occurs when the form of Figure 6 is driven in reverse. In that case the runner is held stationary.

The structure in the form of the first five figures is effective in overcoming the objections above outlined. The electromagnetic clutch is positioned between the runner and the intermediate sun gear 18, and it can be disengaged during the period when either the positive low gear or the reverse gear are in use. When the clutch is disconnected, the runner may run free and may thus turn up to engine speed without acting as a brake on the engine. Any conventional manually operated blade type clutch would be difficult and inconvenient to use because of the necessity of operating levers and the like. For that reason a friction clutch, which may or may not be electromagnetically operated, was designed.

In the particular electromagnetic clutch which is shown herewith, the armature is attached to and rotated by a part of the magnet, and the lengthwise movement of the armature which is caused by the magnetic attraction of the armature to the magnet is thus only used to clamp the driven friction disc 94 between the magnet and the armature faces. The magnetic coil 93 of the clutch is connected into the electrical generator circuit as indicated in the diagram of Figure 5. It is assumed that the transmission herewith disclosed will be mounted on an automotive vehicle and that an electrical generator will also be carried on the vehicle. That generator furnishes electricity for operating the electromagnetic clutch, and it is into the generator circuit that the clutch magnet coil is inserted.

The clutch magnet coil is connected across the brushes of the generator so that any electromotive force or voltage generated in the armature winding 103 of the generator is impressed on the magnet coil 93 and thus causes current to flow through the coil. An important advantage of this arrangement lies in the fact that at idling engine speed there is practically no voltage across the generator brushes, and therefore at that time the magnet coil is not energized and the clutch is not and cannot be engaged. When the engine speed is increased, the voltage across the generator brushes increases, and the magnet coil 93 is progressively energized. The circuit and arrangement of parts disclosed thus constitute what is, in effect, a fully automatic clutch.

In the transmission illustrated, with the gear ratios in the proportions shown, when the transmission is in neutral and the vehicle upon which it is mounted is stationary, and with the engine running at idling speed, the difference in rotative speeds between the two sun gears is 74.7%. Thus, while the small sun gear 9 makes a thousand revolutions, the large sun gear 20 makes 253 revolutions. This is the condition when both gears are driven by the engine through the medium of the gear assembly.

When driving, the intermediate sun gear is normally connected to and driven by the runner through the medium of the magnetically operated friction clutch. At idling engine speed, however, since there is practically no voltage across the generator brushes, the clutch magnet coil 93 is not energized. Under this condition the runner may rotate independently of the intermediate sun gear and may thus come to approximately the same speed as the impeller or the engine. If the vehicle is standing still, and it is desired to put it into forward motion, it is only necessary to accelerate the engine speed, for example, by depressing the accelerator foot pedal. When this is done, the speed of the engine increases, and that of the generator increases correspondingly. Therefore, voltage across the generator brushes increases; the magnet coil 93 is energized; and the clutch is engaged, thus connecting the runner to the intermediate sun gear and causing this gear to rotate at runner speed. One important advantage of this operation lies in the fact that it provides a "time dwell" between the engine speed-up and the clutch engagement, which results in smooth starting and acceleration.

The switches 112 and 113 shown in Figure 5 are provided for breaking the circuit as desired, to de-energize the coil 93 and disengage the clutch whenever the positive low gear drive or the reverse drive gear are in use as a result of the engagement of the brake band 38' with the brake drum 33, or the engagement of the brake band 52 with the drum 38.

Figure 3:
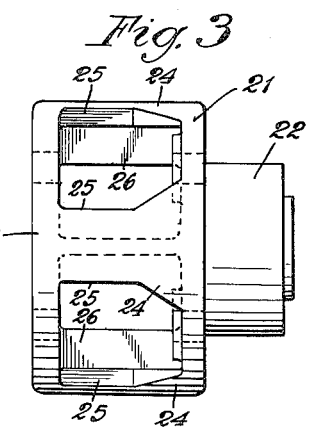
Figure 3 is a side view of the gear carrier, taken on a reduced scale.

The device in the form of Figure 4 differs from that of Figures 1, 2 and 3 by the addition of an overrunning, one-way clutch between the engine and the small sun gear 9. This construction is for use where a drive through gears is at all times permissible. This form of the device provides two gear ratios, one from the small engine-driven sun gear to the cluster gear and to the driven shaft gear, and the other from the fluid coupling-driven sun gear to the cluster gear and to the driven shaft gear.

In the form of Figure 4, neutral is obtained by allowing the carrier containing the cluster gears and the countershafts to rotate backwards. Forward drive is provided by checking and stopping the backward rotation of the carrier 22, 23. When this is done, the drive is through the positive low gear from the engine through the one-way clutch to the small sun gear, thence to the cluster gear, and finally to the driven shaft gear. During this time the fluid coupling slip is at its maximum. When the torque required decreases and the fluid coupling alone is sufficient to carry the load through its gear reduction drive, the fluid coupling slip decreases and the small sun gear is then driven idly by the cluster gears, and overruns the engine.

When with the form of Figure 4, it is desirable to use the positive low gear ratio for a prolonged period, the magnet coil circuit is broken by a switch, and the friction clutch is disengaged. Thus the fluid coupling is bypassed and the runner may return free.

With the form of Figure 4, reverse drive is obtained by stopping the rotation of the intermediate sun gear in the manner above described in connection with the operation of the device as shown in Figure 6.

I claim:

1. In combination in a drive, a driving shaft and a driven shaft, a fluid coupling impeller and a first sun gear fixed in relation to the driving shaft, a rotary member positioned about said driving shaft, a fluid runner positioned to be driven by said impeller, and a magnetic clutch positioned and adapted when energized to fix said runner in relation to said rotary member and when de-energized to release said runner from said rotary member, a second sun gear fixed in relation to said runner and of greater diameter than said first sun gear, a third sun gear fixed in relation to said driven shaft and of greater diameter than said first and second sun gears, and a planet carrier positioned to rotate with respect to said driving and driven shafts and with respect to said rotary member, a plurality of multiple planet gears positioned for rotation in said carrier, said planet gears meshing with said sun gears, and a brake drum fixed in relation to said rotary member, and brake means adapted to be brought into contact with said drum to hold it stationary and thereby to hold stationary the runner and the second of said sun gears, and a second brake drum fixed in relation to said carrier, and brake means positioned adjacent said second brake drum and adapted to be brought into contact therewith to hold said drum and said carrier stationary.

2. In combination in a drive, a driving shaft and a driven shaft, a fluid coupling impeller and a first sun gear fixed in relation to the driving shaft, a rotary member positioned about said driving shaft, a fluid runner positioned to be driven by said impeller, and a magnetic clutch positioned and adapted when energized to fix said runner in relation to said rotary member and when de-energized to release said runner from said rotary member, a second sun gear fixed in relation to said runner and of greater diameter than and having a larger number of teeth than said first sun gear, a third sun gear fixed in relation to said driven shaft and of greater diameter than and having a larger number of teeth than said first and second sun gears, and a planet carrier positioned to rotate with respect to said driving and driven shafts and with respect to said rotary member, a plurality of multiple planet gears positioned for rotation in said carrier, said planet gears meshing with said sun gears, and a brake drum fixed in relation to said rotary member, and brake means adapted to be brought into contact with said drum to hold it stationary and thereby to hold stationary the runner and the second of said sun gears, and a second brake drum fixed in relation to said carrier, and brake means positioned adjacent said second brake drum and adapted to be brought into contact therewith to hold said drum and said carrier stationary.

3. In combination in a drive, a driving shaft and a driven shaft, a fluid coupling impeller and a first sun gear fixed in relation to the driving shaft, a rotary member positioned about said driving shaft, a fluid runner positioned to be driven by said impeller, and a magnetic clutch positioned and adapted when energized to fix said runner in relation to said rotary member and when de-energized to release said runner from said rotary member, a second sun gear fixed in relation to said runner and of greater diameter than and having a larger number of teeth than said first sun gear, a third sun gear fixed in relation to said driven shaft and of greater diameter than and having a larger number of teeth than said first and second sun gears, and a planet carrier positioned to rotate with respect to said driving and driven shafts and with respect to said rotary member, a plurality of multiple planet gears positioned for rotation in said carrier, said planet gears, comprising gear sections of three different sizes, meshing with said sun gears, and a brake drum fixed in relation to said rotary member, and brake means adapted to be brought into contact with said drum to hold it stationary and thereby to hold stationary the runner and the second of said sun gears, and a second brake drum fixed in relation to said carrier, and brake means positioned adjacent said second brake drum and adapted to be brought into contact therewith to hold said drum and said carrier stationary.

4. In combination in a variable speed drive, a driving shaft and a coaxial driven shaft, a fluid coupling impeller, and a first sun gear fixed in relation to the driving shaft, a rotary member positioned about said driving shaft, a fluid runner positioned to be driven by said impeller, and a magnetic clutch positioned and adapted, when energized, to fix said runner in relation to said rotary member and when de-energized to release said runner from said rotary member, a second sun gear fixed in relation to said runner and of greater diameter than said first sun gear, a third sun gear fixed in relation to said driven shaft and of greater diameter than said first and second sun gears, and a planet carrier positioned to rotate coaxially with respect to said driving and driven shafts and with respect to said rotary member, a plurality of multiple planet gears positioned for rotation in said carrier, said planet gears, comprising gear sections of three different sizes, meshing with said sun gears, and a brake drum fixed in relation to said rotary member, and brake means adapted to be brought into contact with said drum to hold it stationary and thereby to hold stationary the runner and the second of said sun gears, and a second brake drum fixed in relation to said carrier, and brake means positioned adjacent said second brake drum and adapted to be brought into contact therewith to hold said drum and said carrier stationary.

5. In combination in a drive, a driving shaft, a fluid coupling impeller and a first sun gear fixed in relation to said shaft to be rotated thereby, a supporting member positioned about said driving shaft, a fluid runner positioned to be driven by said impeller, and a magnetic clutch positioned and adapted when energized to fix said runner in relation to said supporting member and when deenergized to release said runner from said supporting member, a second sun gear of greater size than and having a larger number of teeth than said first sun gear, fixed in relation to said supporting member, a driven shaft, a third sun gear fixed thereon, of greater diameter than and having a larger number of teeth than said first and second gears, and a planetary carrier positioned about said shafts and adapted to rotate with respect thereto, a planetary cluster gear mounted for rotation in said carrier, said planetary gear provided with gear portions adapted to mesh with each of said sun gears, means for holding said runner and said second sun gear stationary, and means for holding said carrier stationary.

6. In combination in a drive, a driving shaft, a fluid coupling impeller and a first sun gear fixed in relation to said shaft to be rotated thereby, a supporting member positioned about said driving shaft, a fluid runner positioned to be driven by said impeller, and a magnetic clutch positioned and adapted when energized to fix said runner in relation to said supporting member and when deenergized to release said runner from said supporting member, a second sun gear of greater size than and having a larger number of teeth than said first sun gear, fixed in relation to said supporting member, a driven shaft, a third sun gear fixed thereon, of greater diameter than and having a larger number of teeth than said first and second gears, and a planetary carrier positioned about said shafts and adapted to rotate with respect thereto, a plurality of planetary cluster gears mounted for rotation in said carrier, each of said planetary gears provided with gear portions adapted to mesh with each of said sun gears, means for holding said runner and said second sun gear stationary, and means for holding said carrier stationary.

SYDNEY C. WATSON.

REFERENCES CITED

The following references are of record in the file of this patent:

UNITED STATES PATENTS

| Number | Name | Date |
|---|---|---|
| 749,516 | Ball | Jan. 12, 1904 |
| 787,908 | Ford | Apr. 25, 1905 |
| 805,484 | Radcliffe | Nov. 28, 1905 |
| 1,028,347 | Gnoeth | June 4, 1912 |
| 1,316,740 | Reeve | Sept. 23, 1919 |
| 2,277,214 | Dodge | Mar. 24, 1942 |
| 2,302,714 | Pollard | Nov. 24, 1942 |
| 2,339,626 | Duffield | Jan. 18, 1944 |
| 2,343,291 | Gilfillan et al. | Mar. 7, 1944 |
| 2,459,829 | Maxwell | Jan. 25, 1949 |